United States Patent [19]

Schupp et al.

[11] Patent Number: 4,517,343

[45] Date of Patent: May 14, 1985

[54] CATHODICALLY ELECTRODEPOSITABLE SURFACE COATING BINDER

[75] Inventors: Eberhard Schupp, Schwetzingen; Fritz E. Kempter, Mannheim, both of Fed. Rep. of Germany

[73] Assignee: BASF Aktiengesellschaft, Fed. Rep. of Germany

[21] Appl. No.: 441,806

[22] Filed: Nov. 15, 1982

[30] Foreign Application Priority Data

Nov. 25, 1981 [DE] Fed. Rep. of Germany ....... 3146640

[51] Int. Cl.³ .................... C08L 61/12; C08L 63/02
[52] U.S. Cl. ................... 525/488; 204/181 C; 525/183; 525/504; 525/508; 525/533; 525/901
[58] Field of Search ............... 525/488, 486, 502, 504, 525/533, 901, 508, 183; 204/181 C; 523/474

[56] References Cited

FOREIGN PATENT DOCUMENTS

| | | |
|---|---|---|
| 2357075 | 11/1973 | Fed. Rep. of Germany . |
| 2419179 | 4/1974 | Fed. Rep. of Germany . |
| 2429527 | 6/1974 | Fed. Rep. of Germany . |
| 2707482 | 1/1978 | Fed. Rep. of Germany . |
| 2749776 | 5/1978 | Fed. Rep. of Germany . |
| 2942488 | 10/1979 | Fed. Rep. of Germany . |
| 3021300 | 6/1980 | Fed. Rep. of Germany . |
| 3123968 | 1/1983 | Fed. Rep. of Germany . |
| 3124088 | 1/1983 | Fed. Rep. of Germany . |
| 3124089 | 1/1983 | Fed. Rep. of Germany . |
| 1551509 | 8/1979 | United Kingdom . |

*Primary Examiner*—Theodore E. Pertilla
*Attorney, Agent, or Firm*—Keil & Weinkauf

[57] ABSTRACT

A cathodic electrocoating binder comprises a mixture of (A) from 50 to 95 percent by weight of one or more polyadducts, polymers and/or polycondensates which possess basic nitrogen groups and (B) from 50 to 5 percent by weight of one or more amide-amines obtained by reacting monocarboxylic and/or dicarboxylic acids, or their esters, with diamines which possess one primary and one secondary amino group per molecule, the secondary amino group carrying a β-hydroxyalkyl group, and the component (A) consists of one or more phenolic Mannich bases, which are obtained from (a) monophenols and/or polyphenols,
(b) one or more primary or secondary amines and
(c) formaldehyde or a formaldehyde donor, and which may or may not have been reacted with epoxy resins, and/or one or more polyadducts, polymers and/or polycondensates which have activated C-C double bonds, some or all of which may be blocked by adduct formation with secondary amines, and, instead of a mixture of (A) and (B), it is also possible to use reaction products of component (B) with component (A) or with intermediates of component (A). These binders are useful for the cathodic electrocoating of metal articles.

9 Claims, No Drawings

CATHODICALLY ELECTRODEPOSITABLE SURFACE COATING BINDER

The present invention relates to cathodic electrocoating binders which are based on polyadducts, polymers and polycondensates possessing basic nitrogen groups and which can be diluted with water when protonated with an acid.

German Laid-Open Application DOS No. 2,357,075 discloses cathodic electrocoating binders which are prepared by reacting phenolic Mannich bases with epoxy resins.

German Laid-Open Application DOS No. 2,942,488 describes polyadducts which possess basic nitrogen groups, and groups, which are bonded to aromatic rings and are capable of crosslinking on baking, of the general formula (I)

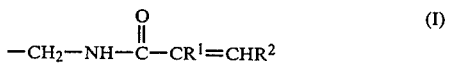

$$-CH_2-NH-\overset{\overset{O}{\|}}{C}-CR^1=CHR^2 \quad (I)$$

where $R^1$ and $R^2$ are identical or different and are each hydrogen or methyl. Polyadducts of this type, also, are useful as cathodic electrocoating binders.

German Patent Application No. P 3,124,088.7 proposes bath compositions for cataphoretic electrocoating which contain phenolic Mannich bases as well as groups of the formula (I) which are bonded to aromatic rings.

All these products have in common the fact that they contain a high proportion of epoxy resins. The baked surface coatings have good adhesion to metal and afford good protection against corrosion, but are somewhat brittle.

It is an object of the present invention to provide a cathodic electrocoating binder which gives surface coatings with improved resilience and impact resistance.

We have found that this object is achieved by the presence of special amide-amines.

The present application relates to a cathodic electrocoating binder which is based on polyadducts, polymers or polycondensates possessing basic nitrogen groups in each case, and can be diluted with water when protonated with an acid, wherein the binder comprises a mixture of (A) from 50 to 95 percent by weight of one or more polyadducts, polymers or polycondensates which possess basic nitrogen groups in each case and (B) from 50 to 5 percent by weight of one or more amide-amines obtained by reacting a monocarboxylic acid of 6 to 24 carbon atoms or a dicarboxylic acid of 4 to 48 carbon atoms, or their esters, with a diamine which possesses one primary and one secondary amino group per molecule, the secondary amino group carrying a β-hydroxyalkyl group, with the proviso that component (A) consists of ($A_1$) one or more phenolic Mannich bases, which are obtained from (a) monophenols or polyphenols, (b) one or more primary or secondary amines and (c) formaldehyde or a formaldehyde donor, and may or may not have been reacted with an epoxy resin, or ($A_2$) one or more polyadducts, polymers or polycondensates which have activated C—C double bonds, some or all of which can be blocked by adduct formation with a secondary amine, and, instead of a mixture of (A) and (B), the reaction product of component (B) with component (A) or with an intermediate of component (A) can also be used.

The present invention furthermore relates to the use of the novel cathodic electrocoating binder for metal articles.

The novel binders can be processed in an advantageous manner, give stable electrocoating baths with high throwing power and high dielectric strength, and produce coatings with very good mechanical properties, in particular high toughness and resilience.

The following details may be noted concerning the components which make up the surface-coating binder according to the invention:

Suitable components (A) are polyadducts, polymers or polycondensates which possess basic nitrogen groups in each case and which consists of:

($A_1$) one or more phenolic Mannich bases, which are obtained from (a) monophenols and/or polyphenols, (b) one or more primary or secondary amines and (c) formaldehyde or a formaldehyde donor, and may or may not have been reacted with an epoxy resin, and/or ($A_2$) one or more polyadducts, polymers and/or polycondensates possessing activated C—C double bonds, some or all of which can be blocked by adduct formation with secondary amines.

Examples of suitable components ($A_1$) are the products described in German Laid-Open Application DOS No. 2,357,075. Products of this type are prepared, for example, as follows: in a first stage, a condensed phenol, preferably 2,2-bis-[4-hydroxyphenyl]-propane (bisphenol A) is reacted with one or more secondary amines, each of which possesses one or more hydroxyalkyl groups, or a mixture of a secondary amine of this type with another secondary or primary amine, and formaldehyde or a formaldehyde donor. In a second stage, the polymer molecule is built up, in a polyaddition reaction, with an epoxy resin, for example one based on bisphenol A and epichlorohydrin.

Further suitable components ($A_1$) are the products described in German Laid-Open Application DOS No. 2,419,179. These are similar to the products described in German Laid-Open Application DOS No. 2,357,075, but additionally contain phenols which possess ether groups and can be prepared, for example, by reacting bisphenol A with less than the stoichiometric amount of an epoxy resin.

Examples of other products which are suitable as components (A) and have the characteristics of component ($A_1$) as well as of component ($A_2$) are those described in German Patent Application Nos. P 31 24 089.5, P 31 24 088.7 and P 31 23 968.4. Products of this type can be prepared by subjecting a monophenol or polyphenol to a Tscherniac-Einhorn reaction with N-methylolacrylamide, N-methylolmethacrylamide or N-methylolcrotonamide in the presence of an acid, and thereafter, in a Michael addition reaction, adding one or more secondary amines at the double bonds. These phenols may then be subjected to a Mannich reaction with a secondary amine and formaldehyde under conditions conventionally used for such reactions, ie. from room temperature or slightly elevated temperatures to about 120° C., aminomethyl groups being introduced into the remaining free ortho- or para-positions of the phenyl nuclei. When the product is reacted with an epoxy resin, the resin obtained is very suitable as component ($A_1$).

Suitable components ($A_2$) are, in general, polyadducts, polycondensates or polymers which in each case possess C—C double bonds which are activated by adjacent electron-attracting substituents. Examples of such activated double bonds are acrylic, methacrylic and crotonic double bonds which may be incorporated via an amide or ester group.

Products of this type can be prepared, for example as described in German Laid-Open Application DOS No. 2,707,482, by reacting a resin containing both tertiary amino and hydroxyl groups with a diisocyanate which has been reacted beforehand with, for example, hydroxyethyl acrylate to convert half the molecule. Suitable products may also be obtained by reacting some of the epoxide groups of an epoxy resin with an amine and reacting the remainder of these groups with acrylic acid or methacrylic acid, as described in, for example, German Laid-Open Applications DOS No. 2,429,527 and DOS No. 2,749,776.

The vinyl ester resin which can be prepared from an epoxy resin and acrylic acid, methacrylic acid or the half ester of tetrahydrophthalic and hydroxymethyl methacrylate can also be used as component ($A_2$). These vinyl ester resins must be modified to introduce a basic group, for example by adduct formation with a diisocyanate which has been reacted, to convert half the molecule, with an alcohol possessing a tertiary amino group.

Resins whose activated double bonds are present in the form of acrylamidomethyl or methacrylamidomethyl groups bonded to aromatic rings may likewise be employed as component ($A_2$). The preparation of such resins is described in German Laid-Open Applications DOS No. 2,942,488 and DOS No. 3,021,300.4.

The novel surface-coating binder in general contains component (A) in an amount of from 50 to 95, preferably from 75 to 90, percent by weight, based on the total amount of components (A)+(B).

(B) Suitable amide-amines (B) are those which are obtained by reacting a monocarboxylic acid of 6 to 24, preferably 10 to 18, carbon atoms and/or a dicarboxylic acid of 4 to 48, preferably 6 to 36, carbon atoms, or their esters, with a diamine which possesses one primary and one secondary amino group per molecule, the secondary amino group carrying a β-hydroxyalkyl group. Amide-amines of this type can be prepared, for example, simply by heating the above components at from 100° to 250° C., water or alcohol being split off.

Suitable monocarboxylic acids are those of no less than 24 carbon atoms, but the number of carbon atoms should be no less than 6 in order to impart resilience or plasticity to the product. Examples of suitable monocarboxylic acids are caproic acid, ethylhexanoic acid and versatic acid, and naturally occurring fatty acids or their hydrogenation products, eg. stearic acid, palmitic acid, oleic acid, linoleic acid and linolenic acid, or naturally occurring mixtures, eg. soya bean fatty acid, linseed oil fatty acid, etc. are particularly suitable.

Suitable dicarboxylic acids are those of 4 to 48 carbon atoms, examples being succinic acid, glutaric acid and adipic acid. Dimerized fatty acids are particularly suitable. The monocarboxylic acids or dicarboxylic acids can be employed either as free acids or in the form of their esters with lower alcohols, eg. methanol, ethanol or propanol. Instead of fatty acids, naturally occurring oils, ie. the glycerol esters of these acids, may also be employed.

Particularly suitable diamines which possess one primary and one secondary amino group per molecule, where the secondary amino group carries a β-hydroxyalkyl group, are those in which the amino groups are separated by 2 to 6 carbon atoms and whose secondary amino group carries a β-hydroxyethyl, β-hydroxypropyl or β-hydroxybutyl group. Examples of these are aminoethylethanolamine, aminopropylethanolamine, aminoethylisopropanolamine and aminopropylisopropanolamine.

In the reaction of the carboxylic acid with the primary/secondary diamine, in general one mole of amine is employed per equivalent of carboxylic acid or ester, but it is also possible to use slightly less than the stoichiometric amount of amine, especially in the reaction with a dicarboxylic acid. In this reaction, polycondensation leads to short-chain polyamides with terminal amino groups.

To obtain amide-amines which can be used, in accordance with the invention, as component (B), it is absolutely necessary to use, for the reaction with the carboxylic acid, a primary/secondary diamine in which the secondary amino group carries a β-hydroxyalkyl group. When other diamines, for example primary diamines, such as ethylenediamine or propylenediamine, or primary/secondary amines whose secondary amino group carries an alkyl group are used for the reaction with the carboxylic acid, a mixture of diamides, amide-amines and free diamines are obtained, since the differences in the reactivities of the individual amino groups in respect of condensation with a carboxylic acid are too small.

If, on the other hand, a carboxylic acid or its ester is reacted with a primary/secondary diamine whose secondary amino group carries a -hydroxyalkyl group, the primary amino group reacts preferentially. One mole of a diamine and one mole of a monocarboxylic acid or its ester give virtually pure amide-amine with free secondary amino groups, while one mole of a dicarboxylic acid and 2 moles of a diamine give a diamide-amine with 2 secondary amino groups. These special amide-amines are employed, in accordance with the invention, in combination with the component ($A_1$) and/or component ($A_2$) in order to prepare a resilient and impact-resistant cathodic electrocoating binder.

The amide-amines employed as component (B) can be used as a mixture with components ($A_1$) and/or ($A_2$), but in many cases it is advantageous to incorporate the amide-amines into one or both of components ($A_1$) and ($A_2$).

If the amide-amine (B) is to be incorporated into polymers possessing activated double bonds ($A_2$), this may be effected by addition of the amide-amine at these double bonds by means of a Michael reaction. Incorporation into component ($A_1$) can be effected by means of a Mannich reaction. Advantageously, this reaction is carried out by a method in which the amide-amine and other primary or secondary amines are condensed with formaldehyde and phenols to give phenolic Mannich bases, which may or may not be subsequently reacted with an epoxy resin.

Where components ($A_1$) and ($A_2$) are epoxy resins which have been modified to contain activated double bonds, for example those resins described in German Laid-Open Applications DOS No. 2,429,527, DOS No. 2,749,776 and DOS No. 2,942,488, the amide-amine can also be incorporated into either of these components by reaction of its amino groups with the epoxide groups of the epoxy resins employed. Amide-amines which are obtained from dicarboxylic acids and are substantially difunctional give, in this reaction, epoxy resins having extended chains. However, it is also possible to use an amide-amine which is based on a monocarboxylic acid, and which undergoes addition at one of the epoxide groups of the epoxy resin and hence incorporates into the molecule terminal or side chains which impart plasticity.

Of course, it is also possible to employ an amide-amine obtained from a mixture of a dicarboxylic acid with a monocarboxylic acid.

The amount of amide-amine (B) employed depends on the desired mechanical properties of the surface coatings obtainable with the coating bath prepared from the novel binders, and may vary from 5 to 50%, based on the total amount of binder components (A)+(B). For most purposes, an amount of amide-amine of about 10–25% is sufficient.

After protonation with an acid, for example phosphoric acid or one of its derivatives, but preferably a water-soluble carboxylic acid, eg. acetic acid, formic acid or lactic acid, the novel binders can be diluted with water and may be employed for the cathodic electrocoating of electrically conductive substrates, for example metal articles, sheet metal and the like made of brass, copper, aluminum, iron or steel, which may or may not be chemically pretreated.

The aqueous solutions or dispersions of the surface coating binders, some or all of which are in the form of a salt of a water-soluble carboxylic acid, can in addition contain further assistants conventionally used in cathodic electrocoating, such as pigments, soluble dyes, organic solvents, flow improvers, stabilizers, hardening catalysts, antifoams and other assistants and additives.

The surface coating binders prepared by the novel process can be used both as the principal base resin for electrocoating and as the mill base resin in a pigment paste.

For cathodic electrocoating, the solids content of the electrocoating bath is in general brought to 5–30 percent by weight by dilution with demineralized water. The deposition is in general carried out at from 15° to 40° C. for a period of from 1 to 2 minutes at a bath pH of from 5.0 to 10, preferably from 5.7 to 8.5, at a deposition voltage of from 50 to 500 volt.

After residue of bath material has been rinsed off, the film which has been cathodically deposited on the electrically conductive article is baked at about 140°–200° C. for about 10–40 minutes.

The novel coating compositions, when used for cathodic electrocoating, possess very good throwing power, and give coatings having excellent mechanical properties, such as great hardness and toughness, coupled with very good resilience and firm adhesion to the substrate.

Furthermore, the coatings obtained using these compositions have good solvent resistance and resistance to corrosion, for example in the salt spray test.

In the Examples, parts and percentages are by weight, unless stated otherwise.

Preparation of the amide-amines (B)

Amide-amine I 290 parts of linseed oil fatty acid (eg. ®Nouracid LE 80) and 104 parts of aminoethylethanolamine were heated to 200° C. in the course of 1 hour and kept at this temperature for a further 3½ hours. A total of 18 parts of water were distilled off. After cooling, the product solidifed to give a wax-like mass, and contained 3.5% of basic nitrogen, of which 3.3% was in the form of the secondary amine and 0.2% in the form of the primary amine. Amide-amine II:

291 parts of a commercial dimeric fatty acid containing small added amounts of monomeric and trimeric acids (eg. ®Empol 1014) and 104 parts of aminoethylethanolamine were heated at 170° C. for 30 minutes and thereafter at 200° C. for 4 hours. 18 parts of water were distilled off during this procedure. After the mixture had been cooled, a highly viscous oil containing 3.5% of basic nitrogen was obtained.

EXAMPLE 1

(a) Preparation of an intermediate containing phenolic groups and ether groups 420 parts of a triglycidyl ether, obtained from pentaerythritol and epichlorohydrin and having an epoxide value of 0.62, and 73.2 parts of phenol were stirred for 30 minutes at 180° C., after which 364.6 parts of bisphenol A were added. The mixture was allowed to react further for 1 hour at 180° C., and then diluted with 420 parts of toluene to give a solids content of 67.8%.

(b) Tscherniac-Einhorn/Michael reaction 430 parts of the product obtained according to (a), 136.5 parts of acrylamide, 79.7 parts of paraformaldehyde, 91 parts of p-tert.-butylphenol, 0.4 part of phenothiazine and 78 parts of bisphenol A were brought into solution at 115° C. The solution was then cooled to 60° C., and 1 part of boron trifluoride ethyl etherate was added. After reaction for 30 minutes at 60° C., a further 1 part of boron trifluoride ethyl etherate was added, followed by another 0.7 part after another 30 minutes at 60° C. Reaction was continued for 3 hours at 60° C., while stirring, and water was then eliminated at 120° C. Thereafter, 202 parts of diethanolamine were added dropwise at 90° C., and the mixture was allowed to continue reacting for a further 2 hours at this temperature, and was then diluted with 29.4 parts of isobutanol, 29.4 parts of isopropanol, 110 parts of butylglycol and 110 parts of ethylglycol. The solids content was 67.3%.

(c) Preparation of the electrocoating binder 252.6 parts of the product prepared according to (b), 33.5 parts of paraformaldehyde, 125 parts of bisphenol A, 37.3 parts of diethanolamine, 40 parts of dibutylamine, 50 parts of amide-amine II and 60 parts of isobutanol were stirred for 15 minutes at 50° C. and then for 2.5 hours at 80° C. 137.3 parts of a diglycidyl ether, obtained from bisphenol A and epichlorohydrin and having an epoxide value of 0.2, 54.7 parts of a triglycidyl ether, obtained from pentaerythritol and epichlorohydrin and having an epoxide value of 0.62, and 60 parts of isobutanol were then added. The mixture was allowed to continue reacting at 70° C. until the viscosity reached 1,200 mPa.s (measured by means of an ICI plate-and-cone viscometer at 75° C.), and was finally diluted with 50 parts of isobutanol. The solids content was 71.6%.

(d) Electrocoating and testing

To prepare a 10% strength coating bath, 100 parts of the solid resin (c), 100 ppm of $Cu^{++}$ (based on bath volume) as a copper acetate solution, and 5 parts of isodecanol were mixed thoroughly, protonation was effected with 1.6% of acetic acid (based on solid resin) and the mixture was made up to 1,000 parts with fully demineralized water. The coating bath was then stirred for 48 hours at 30° C., after which it had a pH of 7.25 and a conductivity of 950 $\mu$S.cm$^{-1}$. On phosphatized steel sheets which have been made the cathode, deposition for 2 minutes at 165 volt and 30° C., and hardening for 20 minutes at 180° C., give a smooth 15 $\mu$m thick coating having an Erichsen deep-drawing value of 9 mm.

EXAMPLE 2

600 parts of phenol, 485 parts of bisphenol A, 1,000 parts of acrylamide, 490 parts of paraformaldehyde and 1 part of 2,6-di-tert.-butyl-p-cresol were introduced successively into a stirred kettle and heated at 120° C., while stirring, until a clear solution was formed. The solution was then cooled, 10 parts of boron trifluoride dimethyl etherate were added at 50° C., and the mixture was kept at this temperature, by cooling, until the reaction was complete. The mixture was then heated to 100° C., kept at this temperature for 30 minutes, during which the water of reaction was distilled off under reduced pressure, and then diluted with 1,000 parts of isobutanol. The product had a solids content of 70%.

40 parts of the amide-amine I, 40 parts of diethanolamine and 0.1 part of 2,6-di-tert.-butyl-p-cresol were added to 157.5 parts of the above product, and the mixture was heated at 80° C. for 1 hour. Thereafter, 120 parts of an epoxy resin, based on bisphenol A and epichlorohydrin and having an epoxide equivalent weight of 190 (eg. ®Epikote 828), and 93 parts of isopropanol were added, and the mixture was heated at 85° C., for 15 hours. After the addition of 10 parts of acetic acid, the product was water-dilutable. 2,500 parts of water were added slowly, while stirring, to give a stable aqueous dispersion having a pH of 6.5 and a solids content of 11%.

EXAMPLE FOR COMPARISON WITH EXAMPLE 2

The procedure described in Example 2 was followed, but without the addition of 40 parts of the amide-amine I. By adding 10 parts of acetic acid and 2,100 parts of water, a stable aqueous dispersion was produced.

The dispersions obtained as described in Example 2 and in the Comparative Example were stirred for 24 hours at 30° C., after which 200 ppm of lead in the form of lead acetate were added in each case. Zinc-phosphatized steel sheets which had not been rinsed to render them passive, as well as degreased steel sheets, were then coated using these baths. The films were baked for 20 minutes at 180° C. The following results were obtained:

| | Example 2 | Comparative Example |
|---|---|---|
| Deposition conditions: | | |
| zinc-phosphatized | 2 min./280 V | 2 min./180 V |
| degreased steel sheet | 2 min./120 V | 2 min./120 V |
| Thickness of coatings: | | |
| zinc-phosphatized | 15$\mu$ | 15$\mu$ |
| degreased steel sheet | 18$\mu$ | 18$\mu$ |
| Salt spray test according to ASTM 480 h: | | |
| zinc-phosphatized | 1 mm | 1 mm |
| degreased steel sheet | 2 mm | 2 mm |
| Erichsen deep-drawing values: | | |
| zinc-phosphatized | 9 mm | 5 mm |
| throwing power (Ford cup) | 18 cm | 13 cm |

EXAMPLE 3

A resin was prepared by a procedure similar to that described in Example 6 of German Laid-Open Application DOS No. 2,357,075, except that, instead of 309 parts of di-n-hexylamine, a mixture of 250 parts of the amide-amine I and 100 parts of di-n-butylamine were used.

EXAMPLE FOR COMPARISON WITH EXAMPLE 3

Example 6 of German Laid-Open Application DOS No. 2,357,075 was repeated.

10% strength dispersions are prepared, as described in German Laid-Open Application DOS No. 2,357,075, from the two resins, and 50 ppm of copper in the form of copper acetate were added to each dispersion. The dispersions were then used for the cataphoretic coating of zinc-phosphatized steel sheets. In the case of Example 3 according to the invention, the loss on baking was 7%, and the resulting surface coating was smooth and glossy and had an Erichsen deep-drawing value of 9 mm. In the case of the comparative example, the loss on baking was 13% and the Erichsen deep-drawing value was 7 mm.

We claim:

1. A cathodic electrocoating binder which is based on polyadducts, copolymers of polycondensates possessing basic nitrogen groups in each case, and can be diluted with water when protonated with an acid, wherein the binder comprises a mixture of
   (A) from 50 to 95 percent by weight of one or more polyadducts, copolymers or polycondensates which possess basic nitrogen groups in each case and
   (B) from 50 to 5 percent by weight of one or more amideamines obtained by reacting a monocarboxylic acid of 6 to 24 carbon atoms or a dicarboxylic acid of 4 to 48 carbon atoms, or their esters, with a diamine which possesses one primary and one secondary amino group per molecule, the secondary amino group carrying a $\beta$-hydroxyalkyl group, with the proviso that component (A) consists of
   (A$_1$) one or more phenolic Mannich bases, which are obtained from
   (a) monophenols or polyphenols,
   (b) one or more secondary amines, each of which possesses one or more hydroxyalkyl groups, or a mixture of a secondary amine of this type with another secondary or primary amine and
   (c) formaldehyde or a formaldehyde donor, or
   (A$_2$) one or more polyadducts, copolymers, or polycondensates possessing acrylic, methacrylic or crotonic double bonds which are incorporated via an amide or ester group, some or all of which can be blocked by adduct formation with a secondary amine, or a mixture of (A$_1$) and (A$_2$), and, instead of a mixture of (A) and (B), the reaction product of component (B) with component (A) or with an intermediate of component (A) can also be used.

2. A surface coating binder as set forth in claim 1, which comprises a mixture of from 75 to 90 percent by weight of component (A) and from 10 to 25 percent by weight of component (B).

3. A surface coating binder as set forth in claim 1, wherein component (B) is an amide-amine obtained by reacting linseed oil fatty acid with a diamine whose amino groups are separated by 2 to 6 carbon atoms and whose secondary amino group carries a β-hydroxyethyl, β-hydroxypropyl or β-hydroxybutyl group.

4. A surface coating binder as set forth in claim 2, wherein component (B) is an amide-amine obtained by reacting linseed oil fatty acid with a diamine whose amino groups are separated by 2 to 6 carbon atoms and whose secondary amino groups carries a β-hydroxyethyl, β-hydroxypropyl or β-hydroxybutyl group.

5. A surface coating binder as set forth in claim 1, wherein component (B) is an amide-amine obtained by reacting a commercial dimeric fatty acid with a diamine whose amino groups are separated by 2 to 6 carbon atoms and whose secondary amino group carries a β-hydroxyethyl, β-hydroxypropyl or β-hydroxybutyl group.

6. A surface coating binder as set forth in claim 2, wherein component (B) is an amide-amine obtained by reacting a commercial dimeric fatty acid with a diamine whose amino groups are separated by 2 to 6 carbon atoms and whose secondary amino group carries a β-hydroxyethyl, β-hydroxypropyl or β-hydroxybutyl group.

7. A surface coating binder as set forth in claim 3, wherein component (B) is a product obtained by reaction of linseed oil fatty acid with a diamine selected from the group consisting of aminoethylethanolamine, aminopropylethanolamine, aminoethylisopropanolamine, and aminopropylisopropanolamine.

8. A surface coating binder as set forth in claim 5, wherein component (B) is a product obtained by reaction of a commercial dimeric fatty acid with a diamine selected from the group consisting of aminoethylethanolamine, aminopropylethanolamine, aminoethylisopropanolamine and aminopropylisopropanolamine.

9. A surface coating binder as set forth in claim 1, wherein the phenolic Mannich base has been built up by reaction with an epoxy resin.

* * * * *

UNITED STATES PATENT AND TRADEMARK OFFICE
CERTIFICATE OF CORRECTION

PATENT NO. : 4,517,343
DATED : May 14, 1985
INVENTOR(S) : Eberhard SCHUPP et al.

It is certified that error appears in the above-identified patent and that said Letters Patent is hereby corrected as shown below:

Claim 1, line 2, "of" should read --or--.

Signed and Sealed this

Fifteenth Day of October 1985

[SEAL]

Attest:

DONALD J. QUIGG

Attesting Officer

Commissioner of Patents and
Trademarks—Designate